United States Patent Office 3,655,810
Patented Apr. 11, 1972

3,655,810
PROCESS FOR DIMERIZING AND CODIMERIZING OLEFINS
Yves Chauvin, Orsay, Gilles Lefebvre, La Celle-St.-Cloud, and Masahiro Uchino, Rueil-Malmaison, France, assignors to Institut Francais du Petrole des Carburants et Lubrifiants, Rueil-Malmaison, France
No Drawing. Filed Nov. 14, 1967, Ser. No. 683,020
Claims priority, application France, Nov. 15, 1966, 83,739, 83,740; Mar. 21, 1967, 99,721
Int. Cl. C07c *3/10*
U.S. Cl. 260—683.15 D                                    30 Claims

ABSTRACT OF THE DISCLOSURE

A process for dimerizing and codimerizing monoolefins wherein at least one of said monoolefins is contacted with a catalyst to effect reaction thereof, said catalyst containing a monohalogenodihydrocarbylaluminum and nickel or a nickel compound, and said process being characterized in that the reaction is conducted in the presence of water in an amount sufficient to increase significantly the activity of said catalyst.

---

This invention relates to a process for dimerizing and codimerizing monoolefins with operating conditions which are more favourable than those previously used, such as: reaction temperature, velocity, yield and in some cases recuperation of the catalyst. The invention, according to a preferred embodiment, relates more particularly to a process of dimerizing propylene into a mixture of monoolefinic hydrocarbons containing six carbon atoms per molecule, a process of codimerizing propylene with n-butenes into a mixture of monoolefins containing 7 carbon atoms per molecule and a process of codimerizing propylene with ethylene into a mixture of monoolefins containing 5 carbon atoms.

The obtained 4-methyl-1-pentene and mixtures of 4-methyl-2-pentenes are of particularly interest in polymerization, specially when carried out according to the process described in the British Pat. 1,027,758 filed on Nov. 20, 1964 or in the French Patents 1,527,740 and 1,527,741, filed on Sept. 14, 1966 and Sept. 15, 1966, respectively in the name of the present applicant.

The 2,3-dimethyl-butene may be used as the starting material in various syntheses and as an additive for gasolines.

The isoheptenes produced by codimerization of propylene with butenes may be used in "oxo" synthesis.

The dimethylbutenes constitute a starting material for the synthesis of isoprene.

It has been already proposed to dimerize and codimerize monoolefins by means of the catalyst resulting from the mixture of a nickel compound with hydrocarbylaluminum halide.

The aluminum compound is usually a dihalogenomonohydrocarbylaluminum or a sesquihalogenide (mixture by equal parts of monohalogenodihydrocarbylaluminum and dihalogenomonohydrocarbylaluminum).

It does not seem, on the contrary, that satisfactory results were readily obtained with monohalogenodihydrocarbylaluminums, and experiments carried out by the applicant himself have confirmed that, by operating under usual conditions (substantially pure and anhydrous reactants, inert atmosphere), the recation velocities, when using monohalogenodihydrocarbylaluminums, were low or zero.

It has now been discovered that the addition of water in catalytic amount, to the mixture of at least one monohalogenodihydrocarbylaluminum with metallic nickel or with a nickel compound, provides a more regular, more selective and particularly a more rapid dimerization and codimerization of monoolefins than by the use of catalysts of the above-mentioned types. By catalytic amount of water it must be understood a sufficient amount to significantly increase the activity of the above-described mixture, taken in anhydrous state.

This favourable action of water constitutes an unexpected phenomenon since, up to now, those skilled in the art had observed an undesirable action of water on organoaluminic derivatives.

The amount of water will be less than two moles per mole of monohalogeno-dihydrocarbylaluminum and preferably less than 0.5 mole per mole of the aluminum compound. The lower proportion will be that from which a positive effect is observed on the reaction velocity, due to the presence of water. A proportion of between 0.01 and 1 mole of water per mole of the aluminum compound is generally an optimal value.

Nickel can be used in a metal form or in the form of a soluble or insoluble compound whereas the soluble compounds generally provide for a slightly higher reaction velocity, the insoluble compounds and the nickel metal, preferably used in the form of a finely divided powder, offer the substantial advantage of being easily recoverable.

There can be mentioned, for instance, the nickel oxides and salts with organic or inorganic acids, for example nickel dichloride, nickel divalerate, nickel naphthenates, nickel sulfonates, nickel dibutyldithiocarbamate, nickel diodide, nickel sulfate, and nickel diacetate.

It is also possible to make use of nickel organic complexes, for instance nickel acetylacetonate, nickel carbonyl, nickel bis-cyclopentadienyl, and nickel-allyl chloride.

The preferred complexes, which are particularly active, are those described in the French patent application No. 99,721, filed on Mar. 21, 1967, now French Pat. No. 1,549,202, which are formed of inorganic salts of nickel with trivalent oragnic compounds of phosphorus, of arsenic or of antimony.

Among the mineral salts of nickel, are to be used preferably the halogenides, fluorides, chlorides, bromides, iodides, nitrates, cyanides, and thiocyanates. The organic compounds forming with the nickel salts the complexes which can be used for the preparation of the dimerization and codimerization catalytic systems, are those which comply with the general formula:

wherein Y represents phosphorus, arsenic or antimony; $R_1$, $R_2$ and $R_3$, which can be identical to each other or different, represent a monovalent hydrocarbon radical containing from 1 to 20 carbon atoms, for example alkyl (primary, secondary or tertiaryl), alkenyl, cycloalkyl, cycloalkenyl, aryl, aralkyl radicals, a halogen or hydrogen. At least one of the 3 radicals $R_1$, $R_2$ and $R_3$ will be a hydrocarbon radical as hereabove defined. Two or three valences of Y may be linked to the same hydrocarbon radical, as in the phospholes, phospholines, phospholanes or phosphorinanes. By way of non-limitative examples of compounds of the type:

are mentioned the following: phenyldicyclopentylphosphine, phenyldiisopropylphosphine, phenyldiisobutylphosphine, tricyclohexylphosphine, dichlorophenylphosphine, triisopropylphosphine, tricyclopentylphosphine, and tri-tertiobutylphosphine.

The nickel used can be obtained either by at least partial attack of nickel alloys with other metals (particularly are to be mentioned the alloys Ni-Al, Ni-Si, Ni-Zn which can be attacked by alkaline metal hydroxides with dissolution of the second metal of the alloy), or by reduction of its oxide or of another reducible compound as such or deposited on a solid carrier such as, for instance, kieselguhr, alumina, silica, sepiolite, pumice, coal and the like.

The monohalogenodihydrocarbylaluminum complies with the general formula

wherein X is a halogen, $R_1$ and $R_2$ represent monovalent hydrocarbon radicals, for example an alkyl, alkenyl, cycloalkyl, cycloalkenyl, aryl, arylalkyl, arylalkenyl, alkaryl or alkenylaryl radical, or a corresponding radical wherein the aryl group is replaced by a monovalent heterocyclic radical.

By way of non-limitative example, the following radicals are mentioned: methyl, ethyl, n-propyl, isobutyl, n-pentyl, n-dodecyl, eicosyl, phenyl, naphthyl, tolyl (ortho, meta or para), xylyl, cyclopentyl, cyclohexyl, cyclodecyl, allyl, cyclohexenyl, cinnamyl.

Preferably the alkyl and alkenyl radicals are those containing from 1 to 20 carbon atoms, the cycloalkyl and cycloalkenyl radicals from 5 to 20 carbon atoms, the aryl radicals from 6 to 20 carbon atoms, the arylalkyl, arylalkenyl, alkaryl and alkenylaryl radicals from 7 to 20 carbon atoms, and the heterocyclic radicals of aromatic nature will contain from 2 to 12 carbon atoms and from 1 to 3 heteroatoms selected from the group consisting of $=N-$, $-S-$, and $-O-$. Chlorides and bromides of dihydrocarbyl aluminum will be preferred to other halides.

The authors of this invention recognize as previously known the different forms of nickel or nickel compounds, as well as species complying with their definition of the aluminum compound. They do not therefore intend in any way to limit the scope of the invention to the forms specifically mentioned in the present description.

As prior art, there can be be referred to U.S. Pat. 2,969,408 filed on Dec. 30, 1955 and to French Pat. 1,385,503 filed on Nov. 28, 1963.

For the carrying out of the invention, except with respect to the use of water, there can be used operating conditions which are conventional for these reactions.

It is possible for instance, to proceed with or without a conventional solvent, at a temperature usually between $-40$ and $+60°$ C. (in view of the high activity of the catalyst, it is preferred to use relatively low temperatures, for instance between $-20$ and $+20°$ C.) under a sufficient pressure for maintaining a liquid phase, for instance between 0.5 and 50 atmospheres.

The proportions of the nickel compound and of the aluminum compound can be varied within wide limits as already known. By way of non-limitative example, there will be mentioned concentrations of from 0.02 to 50 milliatoms of nickel per liter of liquid phase. The atomic ratio Al/Ni may vary, for instance, between 0.02 and 500 and preferably between 0.02 and 50, although these limits are not imperative.

The process can be applied to monoolefins containing from 2 to 12 carbon atoms per molecule such as ethylene, propylene, 1-butene, 2-butene and their homologs with an internal or terminal double bond, either pure or as a mixture. It is however with propylene that the unexpected and advantageous results of the invention are the more completely achieved.

The separation of the products will be carried out in a known way, for instance by inactivation of the catalyst, distillation of the unconverted monomer, fractional distillation of the products, etc.

The following examples illustrate the invention but are not limitative of the scope thereof. Examples 5a and 5b are given only for the purpose of comparison and are not in the scope of the present invention.

EXAMPLES 1 TO 3

Autoclaves are supplied successively with nickel or dry nickel compound, 170 cc. of dry propylene, water and the anhydrous aluminum compound. The starting pressure is the autogenic pressure (5 kg./cm.² at 0° C.). At the end of the reaction, the catalyst is inactivated by addition of an excess of water, the unreacted propylene is separated by distillation and the remaining part of the mixture is analyzed. The yields are expressed by weight. The conditions have been the following:

EXAMPLE 1

8 mg. of nickel acetylacetonate
0.25 cc. of chlorodiethylaluminum
10 microliters of water

EXAMPLE 2

56 mg. of nickel dibutyldithiocarbamate
0.3 cc. of chlorodiethylaluminum
12 microliters of water

EXAMPLE 3

1.1 g. of nickel oxide on a carrier (containing 33% by weight of nickel)
0.25 cc. of chlorodiethylaluminum
10 microliters of water The results are summarized in the following table (in Example 1 the reaction has been so rapid that the temperature could not be maintained constant).

| Conditions | Example No. | | |
|---|---|---|---|
| | 1 | 2 | 3 |
| Temperature, ° C | 0–50 | 0 | 0 |
| Duration (minutes) | 5 | 23 | 200 |
| Yield in oligomers (grams) | 60 | 74 | 65 |
| Ratio of dimers to oligomers, percent | 93 | 95 | 94 |
| Analysis of dimers, percent: | | | |
| 4-methyl 1-pentene | 1.61 | 1.97 | 2.80 |
| 4-methyl 2cis-pentene | 9.67 | 8.90 | 9.21 |
| 4-methyl 2trans-pentene | 46.45 | 44.19 | 44.13 |
| 2,3 dimethyl 1-butene | 3.73 | 2.48 | 3.23 |
| 2-methyl 1-pentene | 4.57 | 4.66 | 4.52 |
| 2-methyl 2-pentene plus 2trans-hexene | 24.54 | 27.99 | 26.81 |
| 2cis-hexene | 5.27 | 5.41 | 5.56 |
| 3-hexene | 4.10 | 4.40 | 3.48 |
| 2,3 dimethyl 2-butene | Traces | | 0.26 |

In the conditions of Examples 1, 2 and 3 but in the absence of water, only traces of oligomers were obtained.

EXAMPLE 4

In an autoclave freed from air and moisture are introduced 200 mg. of nickel acetylacetonate, 75 cc. of 2-butene (mixture with a 63% content of cis isomer), water and 0.47 cc. of diethylaluminum chloride.

The mixture is stirred for 24 hours at 40° C. There are obtained the following results, expressed as function of the amounts of water added:

| Water, microliters | None | 7 | 34 |
|---|---|---|---|
| Liquid oligomers, g | Traces | 15 | 38 |
| $C_8$ olefins percent in oligomers | do | 90 | 82 |

The percentages in this example, as well as in the following ones, are by weight.

EXAMPLE 5

In an autoclave are introduced:

1 g. of Raney nickel, previously dried in hydrogen atmosphere
170 cc. of liquid propylene
10 microliters of water
0.25 cc. of chlorodiethylaluminum The reaction is conducted at 0° C. for 80 minutes.
There are so obtained 65 g. of liquid oligomers having a 93% dimers content.

EXAMPLE 5a

Example is repeated with:

1 g. of dry Raney nickel
170 cc. of propylene
0.75 cc. of a solution in heptane of dichloroethylaluminum (0.25 millimole)

The temperature is maintained at 15° C. The autogenic pressure decreases from 7.8 kg./cm.$^2$ to 4.4 kg./cm.$^2$ in 1 hour 15 minutes.

There are recovered 29 grams of liquid oligomers, 20 grams (69%) of which consist of dimers.

EXAMPLE 5b

Example 5a is repeated but with the addition of 10 microliters of water to the reaction medium. The operating conditions being identical, there are recovered 26 grams of olegomers, 17 grams (65%) of which consist of dimers.

This example thus shows that with dihalogenohydrocarbylaluminums, water has an unfavorable effect.

EXAMPLE 6

Example 5 is repeated with:

1 gram of Raney nickel
170 cc. of propylene
10 microliters of water
0.35 cc. of iododiethylaluminum The reaction is conducted at 0° C. for 5 hours. There are obtained 20 grams of liquid oligomers having a dimers content of more than 98%.

EXAMPLE 7

In an autoclave with double jacket provided with a stirrer, are introduced:

5 mg. of the complex nickel chloride-2 (tribenzylphosphine)
70 g. of propylene
0.3 cc. of bromodiethylaluminum
20 microliters of water The temperature is mainted at 0° C. After 4 hours there are obtained 52 grams of a mixture of isohexenes.

EXAMPLE 8

Under the same conditions as in the preceding example except that bromodiethylaluminum is replaced by chlorodiisohexylaluminum, there were obtained, after 3 hours, 58 grams of a mixture of isohexenes.

EXAMPLE 9

In an autoclave with a double jacket and provided with stirring means, there are introduced:

50 mg. of nickel acetylacetonate
70 g. of anhydrous 2-butene
0.4 cc. of chlorodiisohexylaluminum
30 microliters of water The temperature is maintained at 30° C. Propylene is then introduced in such amount that its concentration in the liquid phase be of about 4%. In proportion as the reaction advances the pressure is lowered so as to maintain in the liquid phase a constant ratio by weight of propylene to butene.

After 6 hours there are obtained 31 grams of a liquid fraction, 26 grams of which are constituted of a mixture of $C_6$, $C_7$ and $C_8$ olefins. The composition of said fraction is as follows:

| | Percent |
|---|---|
| $C_6$ (dimethylbutenes, methylpentenes, n-hexenes) | 50 |
| $C_7$ (dimethylpentenes, methylhexenes, n-heptenes) | 48 |
| $C_8$ (isooctenes) | 2 |

EXAMPLES 10 TO 14

Under conditions close to those of the preceding example, by replacing the diisohexylchloroaluminum by chlorodiethylaluminum and keeping constant the amounts of butenes, chlorodiethylaluminum and water, the nature of the nickel compound is varied. Results of these experiments are given in the following table:

| Example | Nickel compound | Propylene introduced, g. | Reaction duration, hr. | Olefins obtained Weight, g. | Composition, percent $C_6$ | $C_7$ | $C_8$ |
|---|---|---|---|---|---|---|---|
| 10 | NiCl$_2$-2(triphenylphosphine)100 mg. | 42 | 6½ | 63 | 55 | 44 | 1 |
| 11 | NiCl$_2$-2(tricyclohexylphosphine)100 mg. | 18 | 5½ | 18 | 64 | 35 | 1 |
| 12 | NiCl$_2$-2(diethylphenylphosphine) 100 mg. | 37 | 6½ | 46 | 43 | 52 | 5 |
| 13 | NiCl$_2$-2(tributyphosphine)13 mg. | 14 | 2 | 39 | 16 | 51 | 33 |
| 14 | NiCl$_2$-2(tributylphosphine)10 mg. | 23 | 6 | 35 | 35 | 54 | 11 |

EXAMPLE 15

In an autoclave provided with a double jacket are introduced:

4 mg. of the complex NiCl$_2$-2(tricyclohexylphosphine)
40 grams of propylene
10 microliters of water
0.15 cc. of chlorodiisobutylaluminum
3.14 g. of ethylene The temperature is maintained at −20° C. and there are introduced in 202 minutes 31.4 grams of ethylene.

There are obtained, after evaporation of the excess of propylene and ethylene, 54 g. of olefins, 5 grams of which exhibit more than 6 carbon atoms per molecule.

The dimers and codimers have the following composition:

| | Percent |
|---|---|
| Butenes | 21 |
| Pentenes | 40 |
| Hexenes | 39 | which are distributed in:

| Butenes: | Percent |
|---|---|
| 1-butene | 21 |
| 2 trans-butene | 21 |
| 2 cis-butene | 58 |
| Pentenes: | |
| 3-methyl 1-butene | 5 |
| 2-methyl 1-butene | 83 |
| n-Pentenes | 12 |
| Hexenes: | |
| 4-methyl pentenes | 20.5 |
| 2-methyl 1-pentene | 8.5 |
| Dimethyl-butenes | 69.0 |
| n-Hexenes | 2.0 |

EXAMPLE 16

Under the same conditions as in the preceding experiment, there are introduced in the autoclave:

10 mg. of complex NiCl$_2$-2(triphenylphosphine)
50 g. of propylene
0.15 cc. of chlorodiethylaluminum
10 microliters of water
9 grams of ethylene Thereafter were added, in 62 minutes, 34 grams of ethylene. There were obtained 35 grams of dimers and codimers. The composition of the codimer was as follows:

|  | Percent |
|---|---|
| 2-methyl 1-butene | 28 |
| n-Pentenes | 62 |
| 2-methyl 2-butene | 10 |

What is claimed is:

1. A process for dimerizing and codimerizing monoolefins wherein said monoolefins are the sole polymerizable hydrocarbons, said process comprising contacting at least one monoolefin with a catalyst to effect reaction thereof, the catalyst containing simultaneously a monohalogenodihydrocarbylaluminum and nickel in the metal form or in the form of a compound; said process being characterized in that the reaction is conducted in the presence of between 0.01 and 1 mole of water per mole of the aluminum compound thereby significantly increasing the activity of the catalyst for said reaction.

2. A process according to claim 1 wherein the reaction is conducted at a temperature between −40 and +60° C.

3. A process according to claim 1 wherein the reaction is conducted at a temperature between −20 and +20° C.

4. A process according to claim 1 wherein the reaction pressure is sufficient to maintain a liquid phase.

5. A process according to claim 1 wherein the reaction pressure is between 0.5 and 50 atmospheres.

6. A process according to claim 1 wherein the nickel is obtained by attacking alloys of nickel with other elements, with at least partial dissolution of said other elements.

7. A process according to claim 6 wherein said alloys are formed between nickel and respectively, aluminum, silicon or zinc.

8. A process according to claim 6 wherein the alloys are attacked by the hydroxides of alkaline metals.

9. A process according to claim 1 wherein the nickel is obtained by reduction of one of its compounds.

10. A process according to claim 9 wherein the nickel compound is nickel oxide.

11. A process according to claim 9 wherein the nickel compound is deposited on a solid carrier.

12. A process according to claim 1 wherein the nickel is used in the form of a salt of an organic or inorganic acid.

13. A process according to claim 12 wherein the nickel salt is selected from the group consisting of nickel dichloride, nickel diiodide, nickel sulphate, nickel diacetate, nickel divalerate, nickel naphthenate, nickel sulfonate and nickel dibutyldithiocarbamate.

14. A process according to claim 1 wherein nickel is in the form of an organic complex.

15. A process according to claim 14 wherein the nickel complex is selected from the group consisting of nickel acetylacetonate, nickel carbonyl, nickel bicyclopentadienyl and nickel allyl chloride.

16. A process according to claim 14 wherein the nickel complex is formed from an inorganic nickel salt and a compound of the general formula:

wherein Y is arsenic, antimony or phosphorus and wherein R$_1$, R$_2$ and R$_3$ are selected from the group consisting of monovalent hydrocarbon radicals, halogen atoms and hydrogen atoms and wherein at least one of said R's is a monovalent hydrocarbon radical.

17. A process according to claim 16 wherein R$_1$, R$_2$ and R$_3$ represent alkyl, alkenyl, cycloalkyl, cycloalkenyl, aryl or arylalkyl radicals.

18. A process according to claim 16 wherein

represents:
phenyldicyclopentylphosphine, phenyldiisopropylphosphine, phenyldiisobutylphosphine, tricyclohexylphosphine, dichlorophenylphosphine, tricyclopentylphosphine, and tritertiobutylphosphine.

19. A process according to claim 16 wherein the inorganic salt of nickel is selected from the group consisting of halides, nitrates, cyanides and thiocyanates.

20. A process according to claim 6 wherein the amount of nickel used is between 0.02 and 500 milliatoms of nickel per liter of liquid phase.

21. A process according to claim 6 wherein the amount of nickel used is between 0.02 and 50 milliatoms of nickel per liter of liquid phase.

22. A process according to claim 1 wherein the monohalogenodihydrocarbylaluminum complies with the formula:

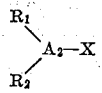

wherein X is a halogen, R$_1$ and R$_2$ are monovalent hydrocarbon radicals containing from 1 to 20 carbon atoms.

23. A process according to claim 22 wherein X represents chlorine.

24. A process according to claim 22 wherein X represents bromine.

25. A process according to claim 22 wherein R$_1$ and R$_2$ are radicals selected from the group consisting of alkyl, alkenyl, cycloalkyl, cycloalkyeneyl, aryl, arylalkyl, arylalkenyl, alkaryl and alkenylaryl.

26. A process according to claim 22 wherein the radicals R$_1$ and R$_2$ are selected from the group consisting of methyl, ethyl, n-propyl, isobutyl, n-pentyl, n-dodecyl, eicosyl, phenyl, naphthyl, tolyl, xylyl cyclodecyl, allyl, cyclohexenyl and cinnamyl.

27. A process according to claim 22 wherein the monohalogenodihydrocarbylaluminum is used in such an amount that the atomic ratio Al/Ni is between 0.02 and 50.

28. The process of claim 1, wherein the monoolefins contain from 2 to 12 carbon atoms per molecule.

29. The process of claim 28, wherein said monoolefin is propylene.

30. A process for dimerizing and codimerizing monoolefins wherein said monoolefins are the sole polymerizable hydrocarbons, said process comprising contacting at least one monoolefin with a catalyst to effect reaction thereof, the catalyst containing simultaneously a monodiorganoaluminum compound having the formula:

wherein X is a halogen and R$_1$ and R$_2$ are monovalent hydrocarbon radicals containing from 1 to 20 carbon atoms or heterocyclic radicals containing 2 to 12 carbon atoms and from 1 to 3 heteroatoms selected from the group consisting of nitrogen, sulfur and oxygen, and nickel in the metal form or in the form of a compound; said process being characterized in that the reaction is conducted in the presence of between 0.01 and 1 mole of water per mole of aluminum compound thereby significantly increasing the activity of the catalyst for said reaction.

References Cited

UNITED STATES PATENTS

| | | | |
|---|---|---|---|
| 3,066,127 | 11/1962 | Carlson et al. | 260—94.3 |
| 3,312,752 | 4/1967 | Schleimer | 260—680 |
| 3,341,617 | 9/1967 | Schleimer et al. | 260—680 |
| 3,440,237 | 4/1969 | Mottus | 260—683.15 X |
| 3,482,001 | 12/1969 | Eberhardt | 260—683.15 |
| 3,390,201 | 6/1968 | Drew | 260—676 |
| 3,396,125 | 8/1968 | Wofford et al. | 260—2 |
| 3,485,881 | 12/1969 | Zuech | 260—683.15 X |
| 3,546,134 | 12/1970 | Wofford et al. | 252—429 |

PAUL M. COUGHLAN, Jr., Primary Examiner

U.S. Cl. X.R.

252—429 B, 430, 431 C